(12) United States Patent
Sönksen et al.

(10) Patent No.: US 7,247,825 B2
(45) Date of Patent: Jul. 24, 2007

(54) METHOD AND APPARATUS FOR SCANNING A SPECIMEN USING AN OPTICAL IMAGING SYSTEM

(75) Inventors: Dirk Sönksen, Schöffengrund (DE); Robert Mainberger, Braunfels (DE); Guenter Schmidt, Leun (DE)

(73) Assignee: Vistec Semiconductor Systems GmbH (DE)

( * ) Notice: Subject to any disclaimer, the term of this patent is extended or adjusted under 35 U.S.C. 154(b) by 259 days.

(21) Appl. No.: 10/604,275

(22) Filed: Jul. 8, 2003

(65) Prior Publication Data

US 2004/0129859 A1 Jul. 8, 2004

(30) Foreign Application Priority Data

Jul. 17, 2002 (DE) ................................. 102 32 242

(51) Int. Cl.
*G01V 8/00* (2006.01)
*G01N 21/00* (2006.01)

(52) U.S. Cl. ............................ 250/201.3; 250/559.22; 356/237.5

(58) Field of Classification Search .. 250/201.2–201.4, 250/234, 559.22, 559.05–559.08, 559.45, 250/559.46; 356/3.01, 4.01, 237.2–237.5, 356/4.05, 609; 359/381–383, 368, 379

See application file for complete search history.

(56) References Cited

U.S. PATENT DOCUMENTS

| 5,780,866 | A | * | 7/1998 | Yamamura et al. ..... 250/559.22 |
| 5,804,813 | A | * | 9/1998 | Wang et al. ............. 250/201.3 |
| 6,172,349 | B1 | | 1/2001 | Katz et al. ................ 250/201.3 |
| 6,245,585 | B1 | * | 6/2001 | Fujimoto ...................... 438/14 |
| 6,256,093 | B1 | | 7/2001 | Ravid et al. ............. 356/237.2 |
| 6,674,058 | B1 | * | 1/2004 | Miller ...................... 250/201.4 |

* cited by examiner

*Primary Examiner*—Thanh X. Luu
*Assistant Examiner*—Stephen Yam
(74) *Attorney, Agent, or Firm*—Houston Eliseeva, LLP

(57) ABSTRACT

The invention is based on an apparatus and a method for scanning specimens (1) using an optical imaging system (3) and a scanning stage (2), images of the specimen (1) being acquired by means of a camera (4), and/or measurements on the specimen (1) being made by means of an optical measurement device (5), at specimen points $X_p$, $Y_p$. For that purpose, the scanning stage (2) is calibrated by obtaining and storing height values Z at different calibration positions X, Y of the scanning stage (2), and thereby generating a running height profile of the scanning stage (2). For the scanning of specimens (1), the specimen height positions $Z_p$ at specimen points $X_p$, $Y_p$ are determined by means of a reference height $Z_{ref}$ of the specimen (1) together with the running height profile of the scanning stage (2). While each specimen point $X_p$, $Y_p$ is being traveled to with the scanning stage (2) the relevant specimen height position $Z_p$ is already being set, so that running errors of the scanning stage (2) are compensated for and image acquisitions or measurements are possible immediately upon reaching the specimen point $X_p$, $Y_p$.

21 Claims, 2 Drawing Sheets

METHOD AND APPARATUS FOR SCANNING A SPECIMEN USING AN OPTICAL IMAGING SYSTEM

CROSS REFERENCE TO RELATED APPLICATIONS

This application claims priority of the German patent application 102 32 242.2 which is incorporated by reference herein.

BACKGROUND OF INVENTION

The invention concerns a method and an apparatus for scanning specimens using an optical imaging system and a scanning stage, images of the specimen being acquired by means of a camera, and/or measurements on the specimen being made by means of an optical measurement device, at specimen points $X_p$, $Y_p$.

The images or measurements performed at the specimen points are used for inspection and mensuration purposes. Inspection and mensuration systems with microscopes, with which faults and defects on wafers can be recognized and classified, are used in particular in semiconductor technology in the manufacture of integrated circuits on wafers. For that purpose, the wafers are displaced with the scanning stage in the X and Y directions. Conventionally, at each inspection or measurement location (specimen point), focusing occurs in the Z direction using a focusing system, and an image is acquired and/or a measurement performed. Focusing at the specimen points is necessary, among other reasons, in order to compensate for mechanical errors of the scanning stage in the Z direction.

The mechanical shortcomings of the scanning stage cause running errors upon displacement of the scanning stage. The running errors are brought about principally by dead weight and by the design of the bearings and guides of the scanning stage. Because of differing torques (resulting, for example, from different overhangs of the scanning stage), differing forces are caused in the bearings of the stage guidance system depending on the particular X-Y position of the scanning stage. These result in different inclinations of the scanning stage as a function of its X-Y position. The scanning stage therefore runs in inhomogeneous fashion upon displacement, i.e. the distance between the surface of the scanning stage and the optical system varies during displacement of the scanning stage.

Because of these running errors of the scanning stage, even in the case of flat specimen surfaces the image field is focused manually or with a focusing system so that a sharply focused image is always available for visual observation, for image acquisition with a camera, or for optical measurement purposes. A method of this kind with conventional focusing at the observation location and subsequent image acquisition or measurement is, however, disadvantageous for the requirements of rapid passes with many image acquisition or measurement points on the specimen, because of the large time expenditure. This is especially the case, of course, when a specimen needs to be completely scanned for a 100% inspection, for example in the case of a wafer in order to identify and classify defects or particles on the wafer surface.

U.S. Pat. No. 6,256,093 describes an on-the-fly automatic substrate defect classification procedure in which the wafer is scanned using an X-Y stage in order to locate defects. A laser light source illuminates the wafer in spot fashion during scanning. No focusing means are used here. The light scattered by the wafer is acquired using at least two separate detectors and evaluated in terms of various properties such as intensity, linearity, and asymmetry.

U.S. Pat. No. 6,172,349 discloses an automatically focusing, high-resolution microscope in which surfaces within the microscope image field differing from the surfaces on which measurements are performed are used for focusing on a wafer. For this, during a set-up phase an identification is made, within each microscope image field, of that surface portion at which, during displacement in the focusing direction, the intensity meets the criterion of maximum signal-to-noise ratio. When the wafer is subsequently inspected, only the light reflection from those identified surface portions within the respective microscope image field is used to focus the microscope. In order to increase wafer throughput, the microscope stage can be continuously displaced from one measurement location to another, and images can be acquired on the fly.

SUMMARY OF INVENTION

It is the object of the invention to describe a method and an apparatus for scanning a specimen using an optical imaging system and a scanning stage which, in simple fashion, can compensate for the mechanical shortcomings of the scanning stage as it is displaced with respect to the optical imaging system, and makes possible fast scanning runs of specimens.

The object is achieved, with a method of the kind cited above, by the following steps:
  calibrating the scanning stage by obtaining and storing height values Z at different calibration positions X, Y of the scanning stage, and thereby generating a running height profile of the scanning stage;
  scanning specimens, in each case
    determining a reference height $Z_{ref}$ of the specimen at the beginning of a specimen scan,
    traveling to specimen points $X_p$, $Y_p$ using the scanning stage,
    setting, while traveling to specimen point $X_p$, $Y_p$, a specimen height position $Z_p$ pertinent to the respective specimen point $X_p$, $Y_p$, the specimen height position $Z_p$ being determined from the reference height $Z_{ref}$ and the running height profile of the scanning stage, and
    acquiring an image and/or performing a measurement at specimen point $X_p$, $Y_p$.

The object is also achieved by way of an apparatus for scanning specimens using an optical imaging system and a scanning stage, the apparatus comprises:
  a control unit for displacing the scanning stage, to at least one calibration position X, Y during a calibration of the scanning stage in order to obtain a height profile of the scanning stage; to specimen at least one specimen point $X_p$, $Y_p$ during scanning of the specimen; and for setting a specimen height position $Z_p$ at each specimen point $X_p$, $Y_p$;
  a memory for storing the height profile of the scanning stage;
  a computation unit for determining the specimen height position $Z_p$ at the respective specimen points $X_p$, $Y_p$ from a reference height $Z_{ref}$ of the specimen and from the height profile of the scanning stage; and
  an optical device for acquiring data at each specimen point $X_p$, $Y_p$.

The advantages of the invention lie in the fact that a high throughput of specimens can be achieved because of the rapid scanning of the specimens, and the specimen is nevertheless sufficiently sharply focused at each specimen point for image acquisitions or measurements. Focusing performed only at the specimen points is eliminated. Even before reaching the specimen points, the scanning stage travels to the associated specimen height position. This ensures that when each specimen point is reached, the specimen is already sharply focused for it. When each specimen point is reached an image can thus be acquired, or a measurement performed, immediately, thereby achieving a time savings when scanning the specimen.

In a particular exemplary embodiment, the image acquisition or measurement is performed on the fly, i.e. the scanning stage travels continuously through the specimen points without stopping. This has the additional advantage that no time-consuming deceleration and restarting of the scanning stage at the specimen points is performed. Specimen throughput is thereby additionally increased. In this context, of course, the image acquisitions or measurements must be accomplished in a correspondingly short time. Such times lie, depending on the application and on the displacement speed of the scanning stage, in the range from a few milliseconds to microseconds. If applicable, xenon flash lamps with correspondingly short flash times are available.

Prior calibration of the scanning stage allows its running errors to be identified, i.e. the variation in height Z as a function of the displacement position of the scanning stage in the X and Y directions is determined. According to the present invention, a running height profile is created from the running errors. Depending on the nature and size of the scanning stage, the maximum variations in height Z can be from a few tens to a few hundreds of micrometers.

A precondition for the method or the apparatus according to the present invention is that the three-dimensional features on the specimen lie within the depth of focus of the imaging optical system, i.e. that the height variations of the features are correspondingly small.

If, on the other hand, the features on the specimen are larger than the depth of focus of the imaging optical system, and the three-dimensional features of the individual specimens are identical to one another, those features can be measured, for example, in a calibration run. The features may also possibly already be known, however, and be available as information in a memory, for example the features of semiconductor wafers. Three-dimensional features of this kind exceeding the depth of the focus of the imaging optical system, known or identified by mensuration, can be taken into consideration for scanning identical specimens by being linked, together with the calibration of the scanning stage, to a running height profile.

The initial calibration during which the running height profile of the scanning stage is identified can be performed with a variety of methods and means. For example, the scanning stage running profile can be scanned mechanically or measured optically, e.g. using a separate laser or by means of a separate image processing system. It is of course also possible to focus manually at various X, Y positions of the scanning stage using the imaging optical system, and to store the identified vertical value Z together with the relevant X, Y positions. If, however, an automatic focusing system is already integrated into the imaging optical system, as is usual with fully automatic inspection and mensuration systems in semiconductor fabrication, the running height profile of the scanning stage is preferably obtained by focusing with the integrated focusing system at several X, Y positions of the scanning stage. Here focusing is performed either directly onto the flat surface of the scanning stage, or onto a flat substrate laid onto the scanning stage. Such substrates can be, for example, a glass plate, a mirror, or an unpatterned blank wafer. LED or laser autofocus systems are preferably used as focusing systems.

Essentially any X, Y positions of the scanning stage can be employed for calibration of the scanning stage. Advantageously, the X, Y positions can be distributed in a regular arrangement, for example at a constant spacing and line-by-line in the X-Y coordinate system of the scanning stage. This particular distribution makes possible time-saving meander-pattern scanning. The density of the X, Y positions for mensuration of the running errors of the scanning stage can be established based on the nature and size of the scanning stage, or on the required accuracy of the measurement tasks.

The X, Y positions, together with the associated Z height values, can be stored in ordinary storage media such as those for magnetic recording, or on a compact disk or in electronic memory modules. A lookup table is especially suitable for this, since it allows rapid access to the memory contents and thus rapid retrieval of the stored values.

These values are used, when specimens are scanned, to obtain the appropriate focus setting at the corresponding specimen points. Consideration is given, in this context, to a reference height $Z_{ref}$ of the specimen, which may possibly differ from one specimen to another. Either reference height $Z_{ref}$ is already known as the thickness of the specimen, or the specimen thickness is identified mechanically or by optical mensuration, or the surface of the specimen is determined as the reference plane.

If the exact thickness of the specimen is already known, it is of course possible to dispense with an initial measurement of specimen thickness or a determination of the reference plane of the specimen. With a previously-known or measured specimen thickness, that thickness corresponds directly to reference height $Z_{ref}$ if the running height profile of the scanning stage refers to the surface of the scanning stage. If the calibration of the scanning stage is performed using a flat substrate lying thereon, the thickness of the substrate must then be correlated with the specimen thickness in order to identify reference height $Z_{ref}$. Reference height $Z_{ref}$ is zero when the thicknesses of the calibration substrate and of the specimen are identical. The running height profile of the scanning stage is referred to reference height $Z_{ref}$ in order to identify specimen vertical positions $Z_p$ at specimen points $X_p$, $Y_p$.

For very accurate measurements and in order to ensure reliability, it is recommended to check each specimen by explicitly determining its thickness or its reference plane. The reference plane is identified by a distance measurement or preferably by focusing. This involves, prior to beginning a specimen scan with a new specimen, traveling to at least one arbitrary location on the specimen and focusing there, so that a reference coordinate triplet $X_{ref}$, $Y_{ref}$, $Z_{ref}$ is obtained. This reference coordinate triplet $X_{ref}$, $Y_{ref}$, $Z_{ref}$ is the reference point for the stored running height profile of the scanning stage. To improve the accuracy of reference height $Z_{ref}$, it is of course possible to travel to several reference locations $X_{ref}$, $Y_{ref}$ on the specimen, focus at each one, and identify for example, by averaging a more accurate reference for the running height profile. The accuracy of the specimen height positions $Z_p$ at specimen points $X_p$, $Y_p$ is thereby also improved.

If specimen point $X_p$, $Y_p$ is not located at a calibration position X, Y, it is possible to determine from the calibration coordinates X, Y, Z located around specimen point $X_p$, $Y_p$, by interpolation or by means of known mathematical approximation functions, the specimen height position $Z_p$ for the specimen point $X_p$, $Y_p$ located between calibration positions X, Y.

If all specimen points $X_p$, $Y_p$ are coincident with calibration positions X, Y, the corresponding height value Z can preferably be taken directly from a lookup table for determination of the specimen height position $Z_p$.

While the scanning stage is traveling to specimen points $X_p$, $Y_p$, the associated specimen height position $Z_p$ is calculated and set. As an alternative to individual calculation before traveling to each specimen point $X_p$, $Y_p$, all the specimen height positions $Z_p$ can also be calculated beforehand, from reference height $Z_{ref}$ and the running vertical profile of the scanning stage, and stored. The specimen height positions $Z_p$ can then be retrieved directly as the specimen is scanned. A prerequisite for this alternative is, of course, that all specimen points $X_p$, $Y_p$ that might possibly be traveled to are already known before the specimen is scanned. This precondition is met in many applications, especially those in which the specimen is scanned line-by-line.

In principle, systems also exist in which the relative motion between specimen and imaging system is also implemented conversely, with a displaceable imaging optical system and stationary specimen stage, rather than with a displaceable scanning stage and stationary imaging optical system. The method according to the present invention of course also applies to such systems, since running errors occur upon displacement of the imaging optical system for scanning the specimen in the same way as is the case with a scanning stage.

Certain investigations of the specimen are performed at specimen points $X_p$, $Y_p$. These usually involve acquiring images of the specimen, and/or making optical measurements on the specimen. If the entire specimen is to be covered in the case of image acquisition, the image field of the camera and the spacings of specimen points $X_p$, $Y_p$, i.e. the density of specimen points $X_p$, $Y_p$, are selected in such away that juxtaposition of the images of all the specimen points $X_p$, $Y_p$ yields an image of the entire specimen. The absolute size of the image field depends on the magnification of the optical imaging system.

The acquired images are in most cases images in the visible wavelength region of light. Images in the infrared or UV regions, or even in the X-ray region, are, however, equally possible. The acquired images are evaluated in order, for example, to detect, analyze, and classify defects or contaminants on the specimen surfaces of semiconductor wafers in particular.

With regard to optical measurements at specimen points $X_p$, $Y_p$, the specimen is generally irradiated with light and the light coming from specimen points $X_p$, $Y_p$, i.e. for example the reflected light or also fluorescent light from the specimen surface, is acquired by the optical imaging system. The intensity or spectral distribution of the acquired light can then be identified using measurement devices, so that conclusions may be drawn therefrom as to the material properties or surface conditions of the specimen. In many cases, a spectrophotometer or ellipsometer is used to identify optical properties such as refractive index, absorption properties, or the thickness of layers that have been applied to the specimen. By scanning the sample, measured data can be acquired from specific portions, or systematically from the entire specimen.

The optical imaging system in question is in particular a microscope or a macroscope. With the microscope, small areas and small features on the specimen are magnified. A macroscope is used to magnify and examine relatively coarse features, and is used e.g. in forensic science.

BRIEF DESCRIPTION OF DRAWINGS

The invention will be explained in more detail below with reference to the exemplary embodiments depicted in the drawings, in which, schematically in each case.

DETAILED DESCRIPTION

Figure 1:
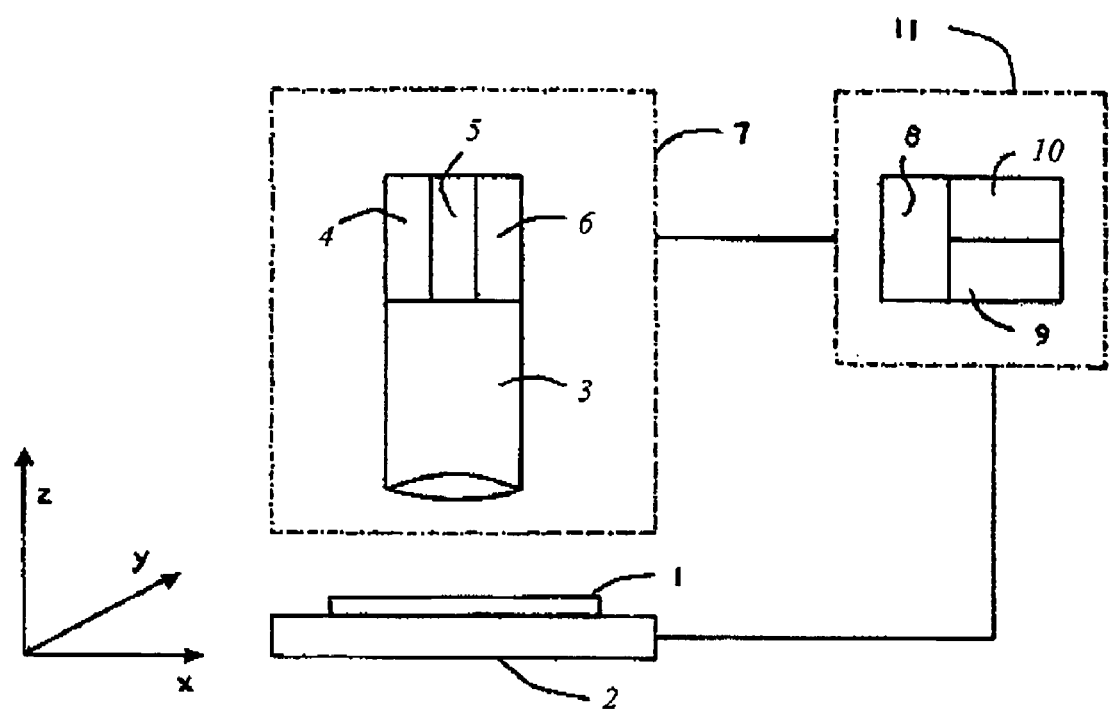
FIG. 1 shows an arrangement with a scanning stage and an optical and electronic system.

FIG. 1 shows an arrangement having a scanning stage 2, an electronics device 11, and an optical arrangement 7. A specimen 1 lying on the scanning stage is to be investigated at various specimen points $X_p$, $Y_p$ using optical arrangement 7. Optical arrangement 7 comprises an optical imaging system 3 and optionally a camera 4 and/or a measurement device 5 and/or a focusing system 6. An electronics device 11 is provided for controlling optical arrangement 7 and scanning stage 2. Said device contains a computation unit 8, a control unit 9, and a memory 10.

Electronics device 11 can be embodied as an external unit or can be integrated into optical arrangement 7, into scanning stage 2, or into a PC. The individual assemblies of electronics device 11 can of course also be distributed; for example, computation unit 8 and memory 10 can be integrated into optical arrangement 7, and control unit 9 into scanning stage 2. An external PC can also, however, serve as computation unit 8 and memory 10, and control unit 9 can be configured separately.

In a first step according to the present invention, a calibration of scanning stage 2 is performed with regard to its running errors. For this purpose, scanning stage 2 is displaced in the X and Y directions. Because of its weight and its mounting in guidance elements, tilts and height fluctuations of the scanning stage surface on which specimen 1 is placed occur during displacement of scanning stage 2. These irregularities and fluctuations of the scanning stage in the Z direction are detectable upon observation of specimen 1 using the optical imaging system, and are troublesome when images are acquired using camera 4, or result in inaccuracies when measuring with measurement device 5. Normally, therefore, focusing occurs at each specimen point $X_p$, $Y_p$ before an image acquisition or measurement is performed. According to the invention, however, a focusing operation is not performed at specimen point $X_p$, $Y_p$; instead, the running errors of scanning stage 2 are already taken into account as specimen point $X_p$, $Y_p$ is traveled to.

To achieve this, the running errors of scanning stage 2 must of course be known. They are determined from a calibration of scanning stage 2. The calibration is accomplished at several calibration positions X, Y. At those positions, a determination is made of the pertinent Z correction values by which the scanning stage must be adjusted in the Z direction so that the absolute Z height of the scanning stage, and thus its distance from imaging system 3, remains constant. These Z correction values can be obtained by mechanical or optical scanning of scanning stage 2 at a plurality of calibration positions X, Y. Optical scans can be performed, for example, using an external laser beam (not depicted in FIG. 1) that measures the changes in inclination and height of scanning stage 2 at calibration positions X, Y.

Optionally, the laser beam can also be passed through optical imaging system 3, and its light reflected from the specimen can be measured using a laser rangefinder present in measurement device 5. The distances between the laser rangefinder and the respective calibration positions X, Y yield a running height profile of scanning stage 2.

Another optical scanning operation encompasses image processing of the images acquired with camera 4, on the principle of a TV autofocus system. Here, scanning stage 2 is displaced in the Z direction at each calibration position X, Y, and images are acquired at various Z positions. From this image stack, a suitable image is identified using certain criteria (e.g. by way of a contrast function), and its associated Z position is the desired height value Z for the calibration position X, Y. In this fashion, the running height profile of scanning stage 2 is obtained.

For image processing, either the surface of a specimen 1 having substantially flat features can be imaged, or alternatively an image projected onto an (in particular) unpatterned surface of a specimen 1, or an image projected directly onto the flat surface of scanning stage 2, can be imaged. In the projected image, appropriate contrasts can be provided for optimum image processing by means of adjacent dark and very bright regions.

A further possibility for optical scanning for identification of the running errors of scanning stage 2 in the Z direction is to focus with focusing system 6 on calibration positions X, Y. Here scanning stage 2 is moved to each calibration position X, Y and stopped there, and focusing occurs onto the surface of scanning stage 2. The height value Z resulting from focusing is stored together with the associated calibration position X, Y. The running height profile of scanning stage 2 is thereby identified.

Focusing system 6 is preferably an LED or laser autofocus system. Instead of focusing directly onto the surface of scanning stage 2, it is also possible to focus onto a suitable flat substrate having a constant thickness, i.e. a blank wafer. This is advantageous in particular if specimens 1 to be investigated later are themselves wafers.

Figure 2:
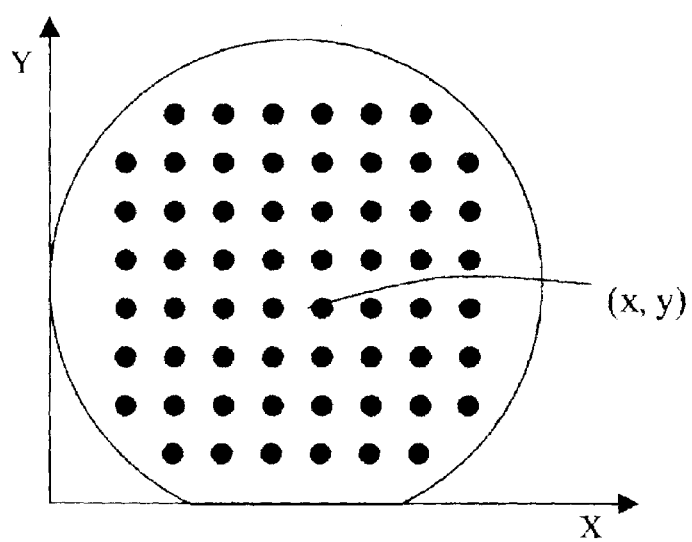
FIG. 2 shows calibration positions X, Y in a regular arrangement.

Calibration positions X, Y can essentially be selected arbitrarily within the X and Y displacement ranges of scanning stage 2. They can also be traveled to arbitrarily during calibration. The arrangement selected for calibration positions X, Y is usually linear, as shown in FIG. 2. In such a case calibration positions X, Y are scanned in meander fashion for calibration. It is additionally advantageous if the entire displacement range of scanning stage 2, or at least the displacement range for specimen 1, is sensed for calibration. The density of calibration positions X, Y can be selected in accordance with the properties of the scanning stage, so that a sufficiently accurate running height profile can be created.

Figure 3:
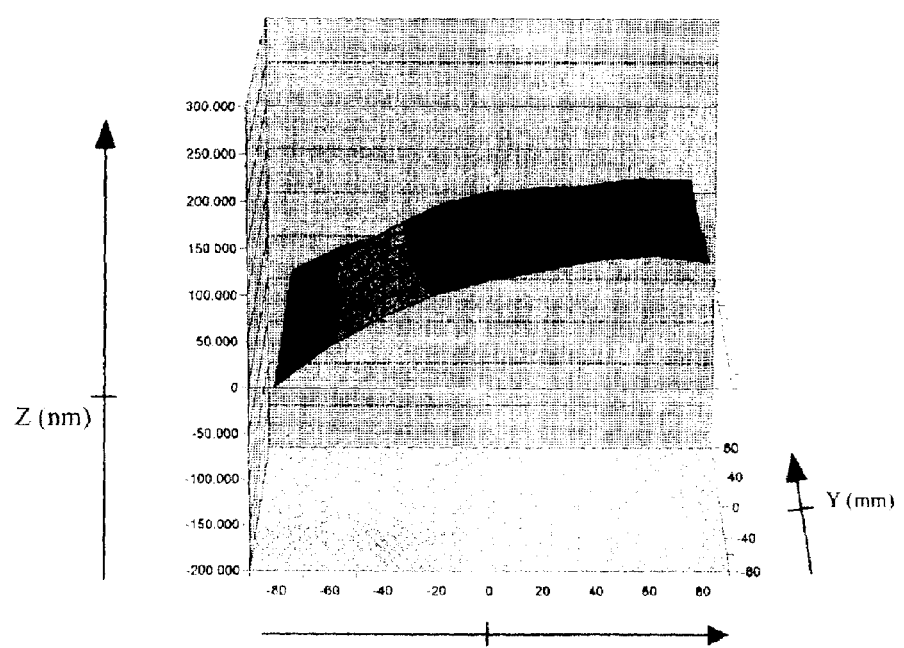
FIG. 3 shows a running height profile of a scanning stage.

The methods and possibilities recited above by way of example thus yield a running height profile of scanning stage 2. FIG. 3 shows an example of a measured running height profile. The identified height values Z are plotted against the associated calibration positions X, Y. The running height profile is stored in memory 10. Scanning stage 2 is thus sensed in terms of its displacement or running properties, and its calibration is complete.

Calibration of scanning stage 2 is accomplished at least once upon assembly of the arrangement shown in FIG. 1. The calibration of scanning stage 2 may be repeated, if applicable, at a later point in time. Recalibration of scanning stage 2 is particularly advantageous in a context of intensive use, since the displacement of scanning stage 2 results in mechanical wear, and the guide elements and therefore the running errors of scanning stage 2 can change.

Based on the calibration, a variety of specimens 1 can now be investigated at any arbitrary specimen points $X_p$, $Y_p$. While scanning stage 2 is moving to a specimen point $X_p$, $Y_p$, the corresponding specimen vertical position $Z_p$, is already being set. Setting of the specimen height position $Z_p$ occurs, at the latest, upon arrival at specimen point $X_p$, $Y_p$.

The specimen vertical position $Z_p$ is determined by way of the calibration, i.e. by means of the running height profile of scanning stage 2. The running height profile is based on a specimen-specific reference height $Z_{ref}$ at a reference location $X_{ref}$, $Y_{ref}$ of specimen 1. For example, if the thickness of the substrate with which calibration of scanning stage 2 was performed is identical to the thickness of specimen 1 being investigated, reference height $Z_{ref}$ is then zero and the calibration values from the running height profile can be used directly without further conversion. If the thicknesses of specimens 1 are different but are known, they are taken into account accordingly and the differences with respect to the substrate thickness are respectively added in order to obtain reference height $Z_{ref}$. The running height profile is correspondingly corrected using this reference height $Z_{ref}$.

Reference heights $Z_{ref}$ are preferably determined experimentally for each new specimen 1 by means of a measurement, e.g. by focusing with focusing system 6 at a reference location $X_{ref}$, $Y_{ref}$. This increases reliability and improves accuracy. Any arbitrary reference location $X_{ref}$, $Y_{ref}$ on the specimen can be selected in this context. Optionally, multiple reference heights $Z_{ref}$ can also be measured at different reference locations $X_{ref}$, $Y_{ref}$ if even greater accuracy is necessary.

From the known or experimentally determined reference height $Z_{ref}$ and the running height profile, the specimen height position $Z_p$ for specimen point $X_p$, $Y_p$ being traveled to is then calculated. This calculation is performed, either only during travel to a specimen point $X_p$, $Y_p$, or beforehand once reference height $Z_{ref}$ has been identified, in order to obtain a corrected running height profile. If calibration positions X, Y coincide with specimen points $X_p$, $Y_p$, the specimen height positions $Z_p$ to be set are then already determined; otherwise they are ascertained, e.g. by interpolation, from the calibration positions X, Y located around a specimen point $X_p$, $Y_p$.

At specimen points $X_p$, $Y_p$, investigations of the specimen are performed; in particular, images are acquired using camera 4 or an image sensor 4, or optical measurements are performed using a measurement device 5. These investigations result, in particular in the context of a plurality of specimen points $X_p$, $Y_p$ at which the specimen is therefore scanned, in a great time savings as a result of the method according to the present invention. This time savings can be further increased by way of image acquisitions or measurements "on the fly," in which the scanning state travels through specimen points $X_p$, $Y_p$ without stopping.

In a specific exemplary embodiment in which specimen 1 is scanned line-by-line in the X direction and an image is to be acquired at each specimen point $X_p$, $Y_p$, a scanning procedure is performed in detail as follows: After specimen 1 has been placed onto scanning stage 2, the latter is first moved to any arbitrary location on specimen 1. This location is referred to as reference location $X_{ref}$, $Y_{ref}$. Reference height $Z_{ref}$ is determined by focusing with focusing system 6 onto reference location $X_{ref}$, $Y_{ref}$. During focusing, scanning stage 2 is moved in the Z direction using a Z drive, so that in the focused state the Z position of scanning stage 2 corresponds to reference height $Z_{ref}$. The same correspondingly applies to alternative focusing methods in which optical imaging system 3 is modified.

At the beginning of the first scan line, control unit 9 receives coordinate information from computation unit 8 regarding specimen points $X_p$, $Y_p$ to be traveled to in that scan line. For these specimen points $X_p$, $Y_p$, the specimen height positions $Z_p$ are calculated using reference height $Z_{ref}$ at reference location $X_{ref}$, $Y_{ref}$ and the running height profile of scanning stage 2. Control unit 9 brings scanning stage 2 into specimen height position $Z_p$ of first specimen point $X_p$, $Y_p$. Stage motion is started. As scanning stage 2 moves through first specimen point $X_p$, $Y_p$, an image is acquired using camera 4 and scanning stage 2 immediately begins to travel to specimen height position $Z_p$ of the next specimen point $X_p$, $Y_p$. For image acquisition, camera 4 is fired by means of a trigger signal (a hardware trigger). The trigger signals are either electrical signals or optical signals (e.g. via light guides). This hardware trigger serves at the same time as a signal for the Z drive of scanning stage 2 to travel to the next height position $Z_p$. Scanning stage 2 is not stopped at specimen points $X_p$, $Y_p$ for acquisition of the images, but instead travels at a constant speed over the entire scan line.

At the end of the first scan line, control unit 9 receives coordinate information from computation unit 8 regarding specimen points $X_p$, $Y_p$ to be traveled to in the second scan line. Once again, the associated specimen height positions $Z_p$ are calculated, and scanning stage 2 travels from the end to the beginning of the second scan line. The entire specimen 1 is scanned in this fashion, and the acquired images are further processed for evaluation. In the case of a semiconductor wafer as specimen 1, the image evaluation can be utilized for the detection of defects on the entire wafer, and for the classification of faults.

The invention claimed is:

1. A method for scanning a wafer using an optical imaging system and a scanning stage, comprising the steps of:
   positioning the wafer with a constant thickness on the scanning stage, the wafer having three-dimensional features within a focusing depth of the imaging system;
   calibrating the scanning stage by obtaining and storing height values Z at different calibration positions X, Y of the scanning stage, and thereby generating a height profile of the scanning stage;
   scanning the wafer, and thereby
     determining a reference height $Z_{ref}$ of the wafer at the beginning of a specimen scan,
     traveling to wafer points $X_p$, $Y_p$ using the scanning stage,
     setting, while traveling to a respective wafer point $X_p$, $Y_p$, a wafer height position $Z_p$ pertinent to the respective wafer point $X_p$, $Y_p$, the wafer specimen height position $Z_p$ being determined from the reference height $Z_{ref}$ and the height profile of the scanning stage, and
     acquiring an image and/or performing a measurement at the respective wafer point $X_p$, $Y_p$.

2. The method as defined in claim 1, wherein images of the wafer are acquired by means of a camera, and/or measurements on the wafer being made by means of an optical measurement device, at the wafer points $X_p$, $Y_p$.

3. The method as defined in claim 1, wherein the reference height $Z_{ref}$ of the wafer is identified at the beginning of the wafer scan by focusing with a focusing system at a reference location $X_{ref}$, $Y_{ref}$ of the wafer.

4. The method as defined in claim 1, wherein upon calibration of the scanning stage, the height values Z are obtained by focusing with a focusing system.

5. The method as defined in claim 1, wherein during the wafer scan, the image is acquired and/or the measurement is made without stopping the scanning stage at the respective wafer point $X_p$, $Y_p$.

6. The method as defined in claim 1, wherein with wafer points $X_p$, $Y_p$ arranged line-by-line, the wafer points $X_p$, $Y_p$ are scanned in meander fashion.

7. The method as defined in claim 1, wherein the height values Z identified at the calibration positions X, Y are stored in a lookup table.

8. The method as defined in claim 1, wherein the wafer height positions $Z_p$ at the wafer points $X_p$, $Y_p$ are determined, by interpolation or mathematical approximation functions, from the height profile of the scanning stage.

9. The method as defined in claim 7, wherein if the calibration positions X, Y and the wafer points $X_p$, $Y_p$ are coincident, the wafer height position $Z_p$ is determined from the corresponding height value Z from the lookup table, and the reference height $Z_{ref}$.

10. The method as defined in claim 1, wherein for calibration of the scanning stage, a flat substrate is placed onto the scanning stage.

11. The method as defined in claim 1, wherein the optical imaging system is a microscope.

12. The method as defined in claim 1, wherein the optical imaging system is a macroscope.

13. The method as defined in claim 3, wherein the focusing system is an LED or laser autofocus system.

14. The method as defined in claim 2, wherein an image field of the camera and the spacings of the wafer points $X_p$, $Y_p$ are selected in such that an image of the entire wafer results when the images of all the wafer points $X_p$, $Y_p$ are juxtaposed.

15. An apparatus for scanning a wafer using an optical imaging system and a scanning stage, comprising:
   a control unit for displacing the scanning stage to at least one calibration position X, Y during a calibration of the scanning stage in order to obtain a height profile of the scanning stage, and for displacing to at least one wafer point $X_p$, $Y_p$ during scanning of the wafer of a constant thickness, the wafer having three-dimensional features within a focusing depth of the imaging system, and for setting a wafer height position $Z_p$ at each wafer point $X_p$, $Y_p$;
   a memory for storing the height profile of the scanning stage;
   a computation unit for determining the wafer height position $Z_p$ at the respective wafer points $X_p$, $Y_p$ from a reference height $Z_{ref}$ of the wafer and from the height profile of the scanning stage; and
   an optical device for acquiring data at each wafer point $X_p$, $Y_p$.

16. The apparatus as defined in claim 15, wherein the optical device is a camera for acquiring images at each wafer point $X_p$, $Y_p$.

17. The apparatus as defined in claim 15, wherein the optical device is an optical measurement device for performing a measurement at respective wafer points $X_p$, $Y_p$.

18. The apparatus as defined in claim 15, wherein a focusing system is provided at least for focusing onto at least one reference location $X_{ref}$, $Y_{ref}$ in order to obtain a reference height value $Z_{ref}$.

19. The apparatus as defined in claim 15, wherein the optical imaging system is a microscope.

20. The apparatus as defined in claim 15, wherein the optical imaging system is a macroscope.

21. The apparatus as defined in claim 17, wherein the measurement device is an optical spectrometer, an ellipsometer, or a layer thickness measurement system.

* * * * *